United States Patent
Behera et al.

(10) Patent No.: US 11,392,388 B2
(45) Date of Patent: Jul. 19, 2022

(54) SYSTEM AND METHOD FOR DYNAMIC DETERMINATION OF A NUMBER OF PARALLEL THREADS FOR A REQUEST

(71) Applicant: Huawei Technologies Co., Ltd., Shenzhen (CN)

(72) Inventors: Mahesh Kumar Behera, Munich (DE); Prasanna Venkatesh Ramamurthi, Munich (DE); Antoni Wolski, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 16/698,646

(22) Filed: Nov. 27, 2019

(65) Prior Publication Data
US 2020/0097297 A1     Mar. 26, 2020

Related U.S. Application Data

(63) Continuation of application No. PCT/EP2017/063112, filed on May 31, 2017.

(51) Int. Cl.
| | |
|---|---|
| *G06F 9/46* | (2006.01) |
| *G06F 9/38* | (2018.01) |
| *G06F 9/50* | (2006.01) |
| *G06F 9/52* | (2006.01) |
| *G06F 12/0842* | (2016.01) |

(52) U.S. Cl.
CPC .......... *G06F 9/3885* (2013.01); *G06F 9/505* (2013.01); *G06F 9/52* (2013.01); *G06F 12/0842* (2013.01); *G06F 2212/62* (2013.01)

(58) Field of Classification Search
CPC .......... G06F 9/3885; G06F 9/505; G06F 9/52; G06F 12/0842; G06F 2212/62
See application file for complete search history.

(56) References Cited

U.S. PATENT DOCUMENTS

| | | |
|---|---|---|
| 6,154,769 A | 11/2000 | Cherkasova et al. |
| 7,743,378 B1 | 6/2010 | Markov |
| 7,984,447 B1 | 7/2011 | Markov |
| 8,214,836 B1 | 7/2012 | Markov |
| 2006/0080285 A1 | 4/2006 | Chowdhuri |

(Continued)

FOREIGN PATENT DOCUMENTS

| | | |
|---|---|---|
| EP | 2819009 A2 | 12/2014 |
| EP | 2843559 A1 | 3/2015 |

OTHER PUBLICATIONS

Kayiran et al., "Neither More Nor Less: Optimizing Thread-level Parallelism for GPGPUs," XP032495040, pp. 157-166, Institute of Electrical and Electronics Engineers, New York, New York (Sep. 2013).

(Continued)

*Primary Examiner* — Gregory A Kessler
(74) *Attorney, Agent, or Firm* — Leydig, Voit & Mayer, Ltd.

(57) ABSTRACT

Provided is a process for determining a number of parallel threads for a request. The process involves receiving availability data regarding processing resources, wherein the availability data indicates which processing resources are idle or are to become idle. Based on the availability data, a number of parallel threads for the request is determined.

16 Claims, 3 Drawing Sheets

(56) References Cited

U.S. PATENT DOCUMENTS

| | | | | |
|---|---|---|---|---|
| 2011/0185358 A1* | 7/2011 | Ostrovsky | ............. | G06F 9/4881 |
| | | | | 718/100 |
| 2015/0339158 A1 | 11/2015 | Harris et al. | | |
| 2019/0146845 A1* | 5/2019 | Shen | .................... | G06F 9/5027 |
| | | | | 718/104 |

OTHER PUBLICATIONS

Giceva et al., "Deployment of Query Plans on Multicores," Proceedings of the VLDB Endowment, vol. 8, No. 3, pp. 233-244, (Nov. 2014).

* cited by examiner

SYSTEM AND METHOD FOR DYNAMIC DETERMINATION OF A NUMBER OF PARALLEL THREADS FOR A REQUEST

CROSS-REFERENCE TO RELATED APPLICATIONS

This application is a continuation of International Patent Application No. PCT/EP2017/063112, filed on May 31, 2017, the disclosure of which is hereby incorporated by reference in its entirety.

FIELD

The present disclosure relates to the parallel execution of threads. In particular, the present disclosure relates to a system and a method for dynamically determining a number of parallel threads for processing one or more incoming requests.

BACKGROUND

To allow exploiting computing resources which can operate in parallel (such as, for example, processors and/or processor cores in a multi-processor or multi-core environment), requests may be designed to allow for being processed by multiple threads which can be executed in parallel.

SUMMARY

According to a first aspect of the present disclosure, there is provided a system comprising multiple processing resources, the processing resources to process multiple threads in parallel and a request dispatcher, the request dispatcher to dispatch incoming requests and determine a number of parallel threads for the requests, wherein the request dispatcher is configured to dynamically determine the number of parallel threads based on an availability of the processing resources for processing the incoming requests.

In this regard, it is noted that the term "thread" as used throughout the description and claims in particular refers to a sequence of machine-readable instructions. Moreover, the term "parallel threads" as used throughout the description and claims in particular refers to a set of threads that are executed in parallel, wherein each thread within the set has its own unique flow of control that is independent of all other threads within the set.

Furthermore, the term "request" as used throughout the description and claims in particular refers to a command having the purpose of activating (execution of) a set of machine-readable instructions. The machine-readable instructions of the set may require to be executed as a single sequence or may be dividable into two or more threads, wherein some or all of the threads may allow to be executed in parallel. In addition, the expression "availability of the processing resources" as used throughout the description and claims in particular refers to whether processing resources are available for processing instructions at a given time instant or within a given time frame.

Accordingly, a system, such as, for example, a query processor in a database management system (DBMS), may dynamically determine whether requests (that can be executed in parallel) are executed in parallel. I.e., the system may dynamically determine a degree to which parallelism is made use of, depending on whether parallel execution seems feasible, given the availability of the processing resources.

For instance, if a request is designed to allow to be handled by executing M threads in parallel, but availability of processing resources is limited to handling only M/2 threads in parallel without interruption and context switches within a given time frame, it may be beneficial to sequentially execute some of the M threads. For instance, this may avoid the delay caused by waiting for processing resources to be available for handling all M threads in parallel, as well as interruption and context switches which may result from assigning more than one thread to a single processing resource which cannot handle more than one thread at a time.

In a first possible implementation form of the first aspect, the request dispatcher is configured to dynamically determine the number of parallel threads based on the availability of the processing resources for processing the incoming requests and a maximum number MR of parallel threads into which the incoming requests can be divided, wherein the determined number of parallel threads is to avoid idle processing resources, unless dictated by the maximum number MR of parallel threads, and more than one thread being concurrently assigned to one processing resource.

Hence, a decision which of the threads (that can be processed in parallel) are actually dispatched to be processed in parallel may be made dependent upon which of the processing resources are available for the parallel execution of said threads. By this, available processing resources may be exploited to a fullest extent possible, while avoiding interruptions and context switching that may increase the time required for completing the incoming requests.

In a second possible implementation form of the first aspect, if a single request is to be dispatched that can be processed by a maximum number M of parallel threads, the determined number of parallel threads for the single request is to be equal to a number P of available processing resources, if P is equal to or smaller than M,
to be equal to M, if P is larger than M,
wherein M and P are positive integers.

Hence, parallel execution of threads may be made use of to its fullest extent possible, if sufficient processing resources are available. But if sufficient processing resources are not available such as, for example, if processing resources are to process threads of another request, threads that can be (in principle) executed in parallel may (nevertheless) be dispatched to a same processing resource (or different processing resources) to be executed sequentially.

In a third possible implementation form of the first aspect, if multiple requests R={1, . . . , N} are to be dispatched that can be processed by a maximum number $M_R$ of parallel threads, the determined number of parallel threads for each of the multiple requests is to be equal to a number P of available processing resources divided by a number N of the multiple requests which are to be dispatched, if P/N is equal to or smaller than $M_R$ for R={1, . . . , N} and P/N an integer.

Hence, if there are not sufficient processing resources available to allow for a highest (possible) degree of parallelism (DOP) when processing the requests, the DOP may be limited to P/N. This may avoid the delay caused by waiting for processing resources to be available for handling the maximum number $M_R$ of parallel thread.

In a fourth possible implementation form of the first aspect, the request dispatcher is to dispatch a request when a processing resource is to become or becomes idle.

Hence, a processing resource may be seen as available from a time instant it becomes idle.

In a fifth possible implementation form of the first aspect, the system further comprises a request executor, wherein the request executor is configured to receive information indicating the number of parallel threads for the requests from the request dispatcher and select one or more processing resources for processing the requests in accordance with the number of parallel threads.

In a sixth possible implementation form of the first aspect, the one or more processing resources are to be selected based on an availability of locally stored data required for processing the requests.

For example, the request executor may strive at distributing parallel threads of a request on processing resources that have some or all data required for processing the request stored in private memory, such as, for example, private caches of the processing resources to reduce or avoid cache misses. Moreover, the request executor may strive at executing each thread of a request by a processing resource that produces a minimum of cache misses or at least reduces cache misses as compared to a worst-case scenario.

In a seventh possible implementation form of the first aspect, each processing resource has a private cache assigned thereto and locally stored data is data stored in the private cache.

In an eighth possible implementation form of the first aspect, the request dispatcher is configured to dynamically determine the number of parallel threads based on an availability of the processing resources for processing the incoming requests and a predicted access to locally stored data required for processing the requests.

For instance, if threads that can (in principle) be executed in parallel operate on the same data, the request dispatcher may decide to execute the threads in sequence, such that the request executor may be enabled to have the same processing resource to execute the threads and make use of the locally stored data.

In a ninth possible implementation form of the first aspect, the system comprises a processor.

In a tenth possible implementation form of the first aspect, the processing resources are processor cores.

According to a second aspect of the present disclosure, there is provided a method comprising receiving, by a request dispatcher of a multi-core processor, a request, wherein the request can be processed by one or more cores of the multi-core processor, receiving, by the request dispatcher, availability data regarding the cores of the multi-core processor, the availability data indicating which cores are idle or are to become idle, and determining, by the request dispatcher, a number of parallel threads for the request based on the availability data.

Accordingly, the multi-core processor dynamically determines whether threads (that can be executed in parallel) are executed in parallel and to which degree parallelism is made use of, depending on whether parallel execution seems feasible if taking into account the availability of the cores. For instance, if a request is designed to allow to be handled by executing M threads in parallel but only M/2 are available, it may be beneficial to sequentially execute some of the M threads to avoid the delay caused by waiting for cores to become available for handling all M threads in parallel, as well as interruption and context switches which may result from assigning more than one thread to a core.

In a first possible implementation form of the second aspect, the request dispatcher is to dynamically determine the number of parallel threads based on the availability data and a maximum number $M_R$ of parallel threads into which the incoming request can be divided, wherein the determined number of parallel threads avoids idle processing resources, unless dictated by the maximum number $M_R$ of parallel threads and more than one thread being concurrently assigned to one core.

Hence, as stated above, the decision which of the threads (that can be processed in parallel) are actually dispatched to be processed in parallel may be made dependent upon which of the processing resources are available for the parallel execution of said threads. By this, processing power of available cores may be exploited to a fullest extent possible while avoiding interruptions and context switching that may delay completing the incoming requests.

In a second possible implementation form of the second aspect, the method further comprises receiving, by a request executor, information for indicating the determined number of parallel threads for the request from the request dispatcher and selecting, by the request executor, one or more cores for processing the request in accordance with the determined number of parallel threads.

In a third possible implementation form of the second aspect, the one or more cores are selected based on an availability of locally stored data required for processing the request.

As stated above, the request executor may strive at distributing parallel threads of a request on cores that have some or all data required for processing the request stored in private memory, such as, for example, private caches of the cores to reduce or avoid cache misses. Moreover, the request executor may strive at executing each thread of a request by a core that produces a minimum of cache misses or at least reduces cache misses as compared to a worst-case scenario.

In a fourth possible implementation form of the second aspect, each core has a private cache and locally stored data is data stored in the private cache.

In a fifth possible implementation form of the second aspect, the availability data comprises data indicating which cores are idle or are to become idle and data indicating a predicted access of the request to data stored in one or more private caches of the cores.

The method of the second aspect and its implementation forms achieve all advantages described above for the system of the first aspect and its respective implementation forms.

According to a third aspect the present disclosure relates to a computer program comprising program code for performing the method according to the second aspect when executed on a computer.

DETAILED DESCRIPTION

Figure 1:
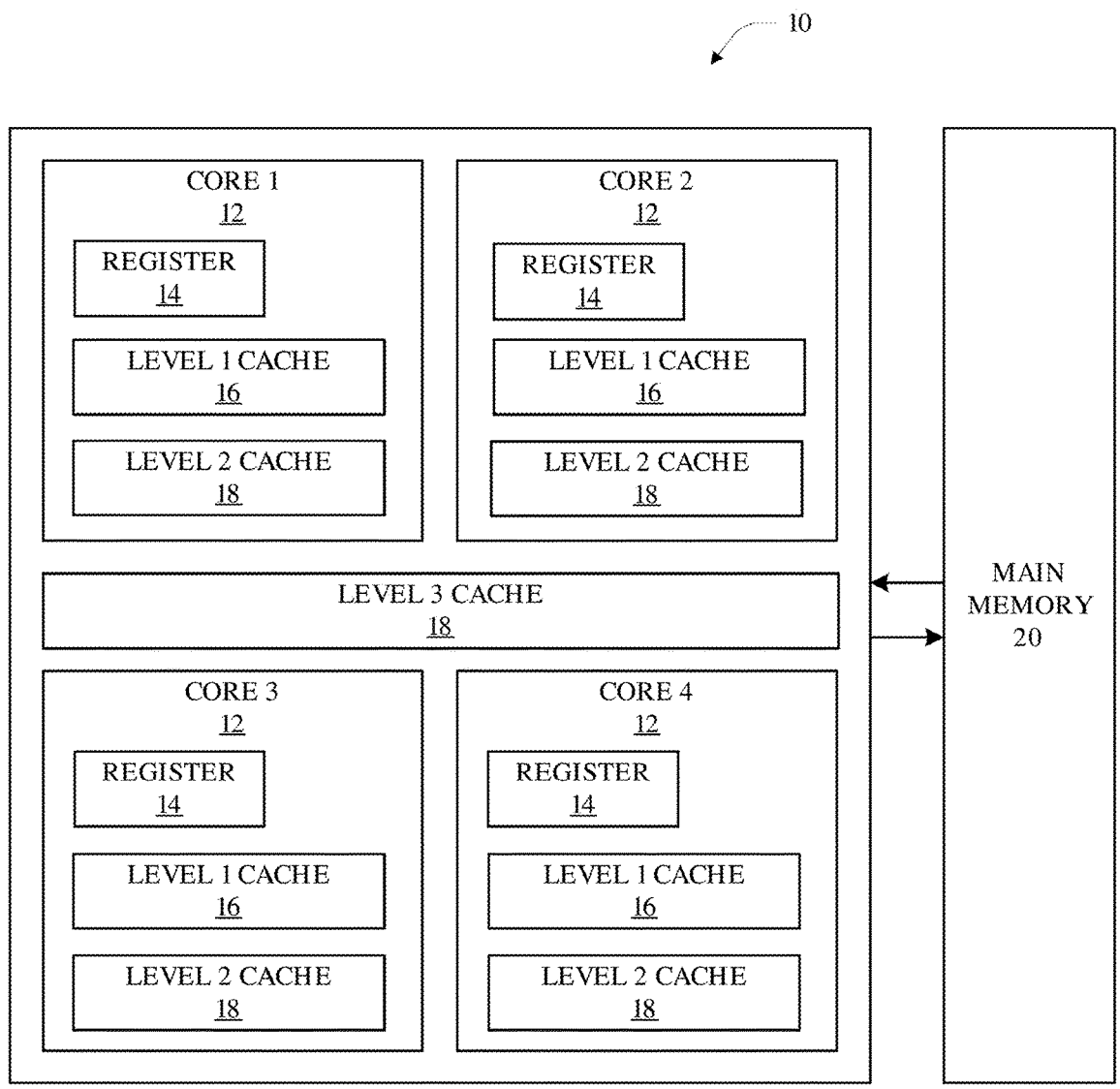
FIG. 1 shows a block diagram of an exemplary processing device in relation to which a process of dynamically determining to which degree parallelism is made use of when parallelizing execution of a request may be carried out.

FIG. 1 shows a block diagram of a multi-core processor (chip) 10 having four cores 12, as an example of a processing device which comprises multiple processing resources. In this regard, it is noted that a processing device may also comprise more than one processor 10, such as more than 5, more than 10, more than 100, or more than 1000 processors. Moreover, although only four processor cores 12 are shown, a processor 10 may also comprise less cores 12 or more cores 12. Each core 12 may have a register 14 and a private memory, e.g., a level 1 cache 16 and a level 2 cache 18.

The processing device may further comprise a shared memory, e.g., a level 3 cache 18 shared by the cores 12. The processing device may also comprise a main memory 20. If the processing device comprises multiple processors 10, the main memory 20 may be shared by the processors 10. The caches 14-18 may be smaller, closer to a processor core 12, and provide faster memory access by storing copies of data from (frequently used) locations of the main memory 20.

To increase processing speed and throughput, threads may be analyzed in view of the data the threads are to fetch from memory during execution. In particular, a thread may be analyzed in view of data being stored, or being to become stored in the private memory.

The threads may then be executed on the cores 12 that store the respective data to avoid cache misses and data sharing among the cores 12. In case of a multi-processor system, requests may also be distributed onto the processors 10 in view of data being available, or being to become available in a shared memory 18 to avoid cache misses and data sharing among the processors 10.

Figure 2:
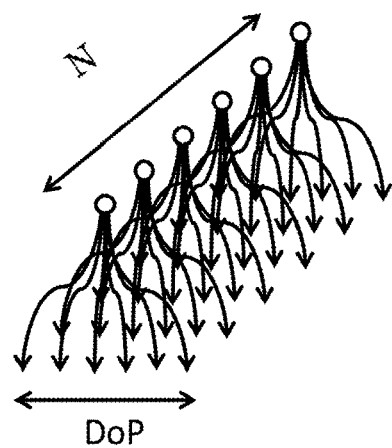
FIG. 2 illustrates a degree of parallelism used for processing incoming requests.

FIG. 2 illustrates processing a number of N requests in parallel. If each request is processed by a number of DoP (Degree of Parallelism) threads, a total number of threads is $$NoT=N*DoP$$

with NoT being the number of threads. If a processing device comprises a number of NoC (Number of Cores) cores, hardware may be used efficiently if $$NoT=NoC$$

Otherwise, if NoT<NoC, some of the cores 12 may be idle, and if NoT>NoC, frequent context switches may lead to cache misses and, possibly, access to the main memory 20. Accordingly, thread execution may strive at maintaining NoT equal or approximately equal to NoC at any time, if possible. This may be achieved by dynamically determining DoP for each request when the requests are scheduled for execution.

In this regard, it is noted that while FIG. 2 shows six requests, wherein each request is processed by six parallel threads, more or less requests may be processed at a given time instant. Moreover, a number of threads by which a request is processed may differ between requests. For instance, a processing device having thirty-six cores, e.g., thirty-six physical or virtual cores, may execute six parallel threads of each of six requests in parallel and meet NoT=NoC. However, NoT=NoC may also be met if twelve parallel threads of each of three requests are executed in parallel or if one request is processed by thirty parallel threads and six requests are each processed by one thread.

Figure 3:
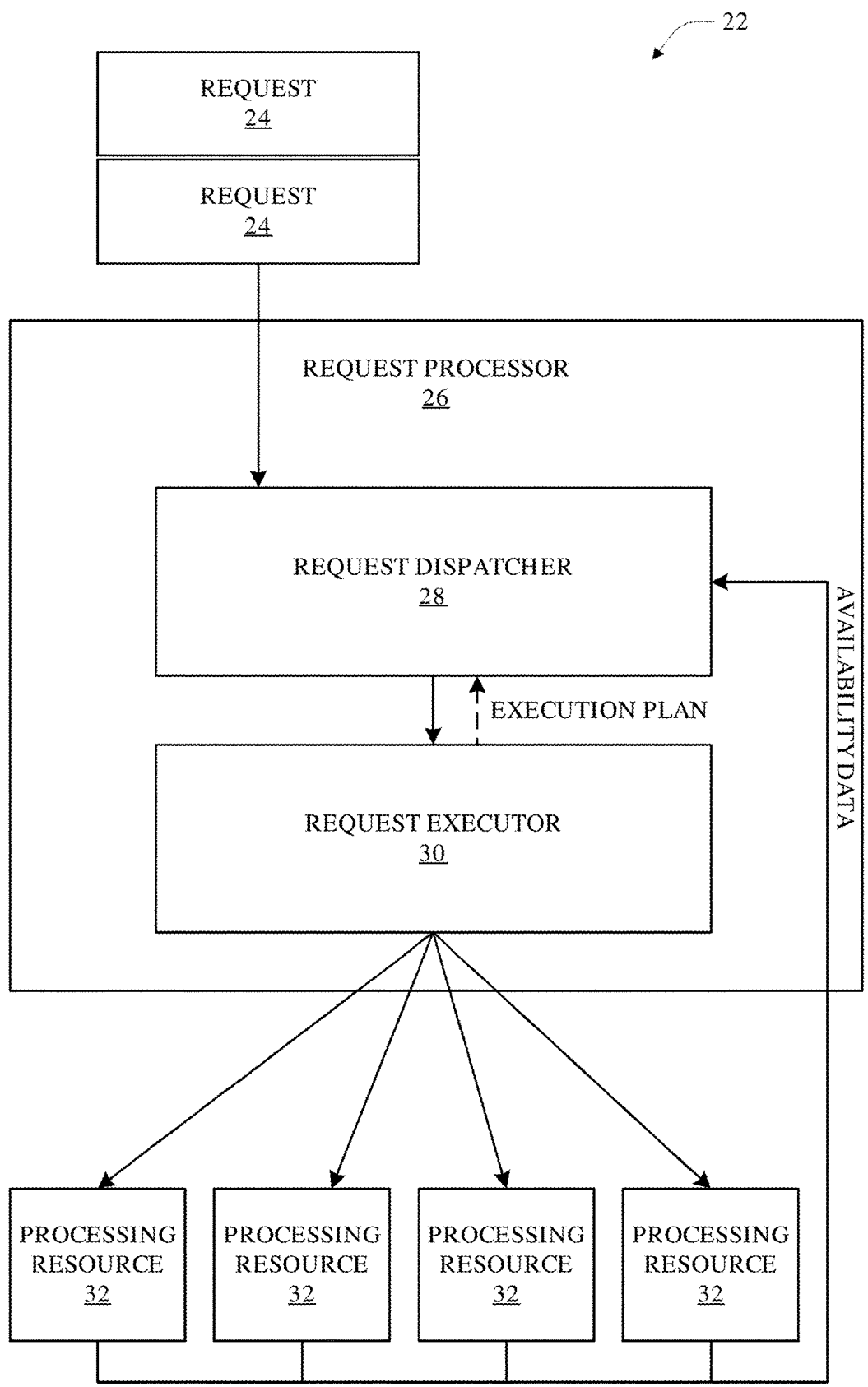
FIG. 3 shows a block diagram of a system which may carry out the process.

FIG. 3 shows a block diagram of a system 22 which may dynamically determine a number of parallel threads for each request 24 when the requests 24 are scheduled for execution. As shown in FIG. 3, the system 22 may comprise a request processor 26. The request processor 26 may include a request dispatcher 28 which may maintain a queue (e.g., a first in, first out queue) in which incoming requests 24 are enqueued. The requests 24 may be dispatched or dequeued from the queue when free processing resources are to become available or are available (e.g., if processor cores 12 are becoming idle or are about to become idle).

For each request 24 to be dispatched, availability data (i.e., resource utilization information such as, for example, CPU utilization) may be acquired from the processing resources 32 which are to process the request 24 (such as, for example, the multi-core processor 10 shown in FIG. 1). Based on this data, the request dispatcher 28 may determine a number of DoP parallel threads for the request 24 and inform the request executor 30 which may produce and execute a parallelized execution plan engaging DoP cores for said request 24.

For instance, if a single request 24 is to be dispatched by the request processor 26 and the number of available processing resources 32 is equal to or smaller than the maximum number of parallel threads by which the request 24 can be handled, the determined number of parallel threads for the request 24 may be equal to the number of available processing resources 32 to avoid context switches. For example, a single request 24 which can be handled by executing four parallel threads may be assigned to only two processing resources 32 if no more than two processing resources 32 are available.

Otherwise, if the number of available processing resources 32 is larger than the maximum number of parallel threads by which the request 24 can be handled, the determined number of parallel threads for the request 24 may be chosen to be equal to the maximum number of parallel threads to avoid/reduce the risk of idle processing resources 32.

If multiple requests 24 are to be dispatched, the processing resources 32 may be divided onto the requests such that each request 24 has the same number of processing resources 32 assigned thereto, unless a number of processing resources 32 thus assigned to a request 24 would be larger than the maximum number of parallel threads by which the request 24 can be handled. By this, all processing resources 32 may be assigned to requests 24, thereby avoiding idle processing resources 32. Further, no processing resource 32 is assigned to several requests 24 which avoids context switches.

The request executor 30 may be configured to take a storage location of the data to be operated on to handle the requests 24 into account. I.e., if the data to be operated on is not present in all private memories of the processing resources 32, the request executor 30 may assign the threads to those processing resources 32 which have a private memory that stores the data to be operated on. For example, if the private cache 16, 18 of one or more processor cores 12 (as an example of processing resources 32) comprises the data to be operated on when handling a request 24 that is to be dispatched, while the private cache 16, 18 of another processor core 12 may not comprise said data, the threads to handle said request 24 may be assigned to the one or more processor cores 12.

If the threads to handle the request were not assigned to the one or more processor cores 12 which have a private cache 16, 18 that stores the data to be operated on, cache misses would occur and delay could be caused by having to fetch the data from the main memory 20. The request executor 30 may thus assign threads to processing resources 32 that locally store the data to avoid accessing a memory shared between the processing resources 32. In addition, the request executor 30 may provide the execution plan to the request dispatcher 28. This may allow the request dispatcher 28 to keep track of/predict the data stored in the private memories of the processing resources 32. If processing resources 32 which have private memories that store data to be operated on by one or more of the requests 24 are available or are about to become available, the request dispatcher 28 may limit the number of DoP parallel threads for said requests 24 to the number of said processing resources 32 to allow the request executor 30 to assign threads to only processing resources 32 that locally store the data to be operated on.

Figure 4:
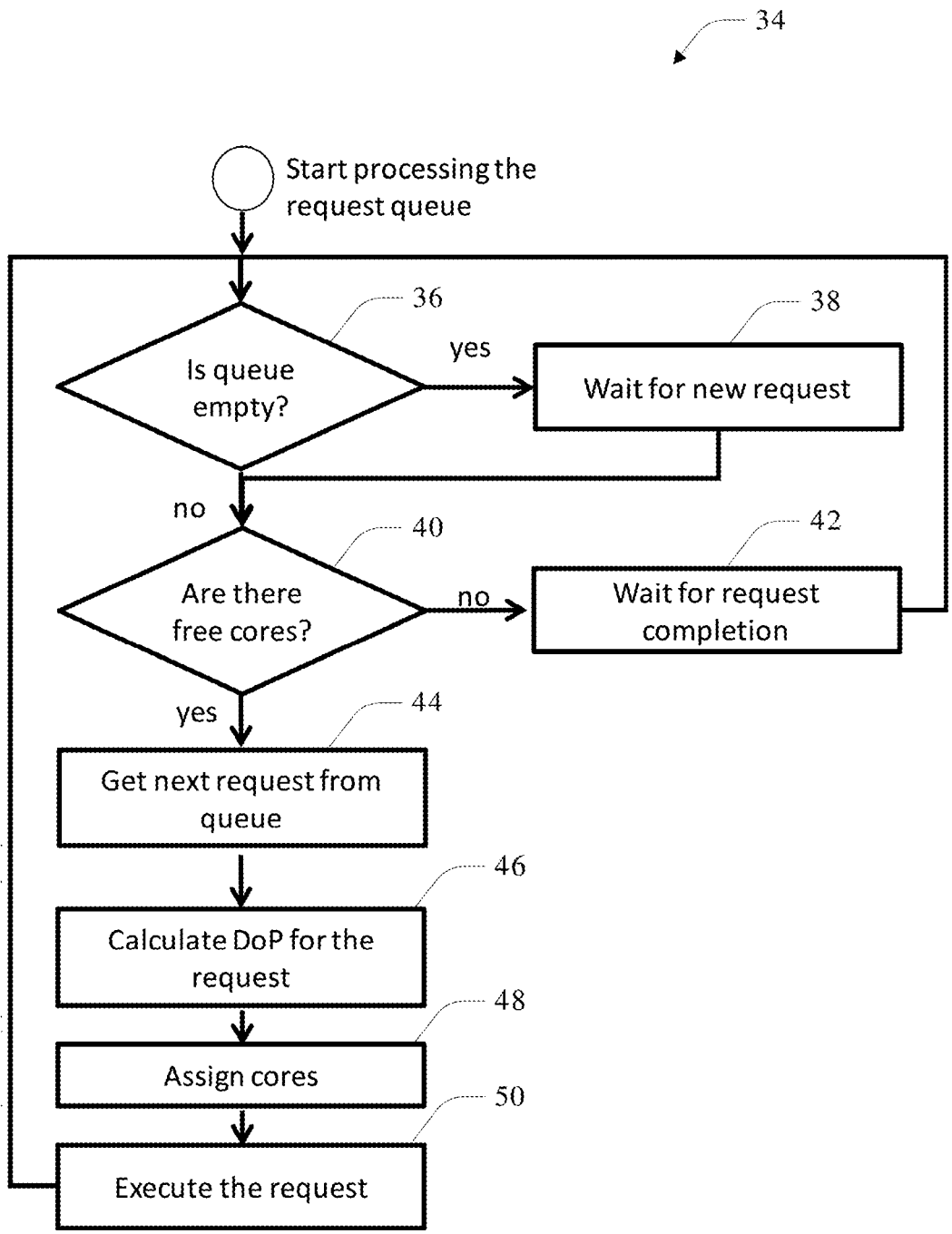
FIG. 4 shows a flow-chart of an exemplary process of dynamically determining to which degree parallelism is made use of when parallelizing execution of a request.

FIG. 4 shows a flow-chart of an exemplary process 34 for dynamically determining a number of DoP parallel threads for a request 24 when parallelizing execution of the request 24. The process 34 may involve a queue to store incoming requests 24 and a request processor 26 assigning processing resources to those requests, as shown in FIG. 3.

The process 34 starts at step 36 with monitoring the request queue. If the queue is empty, the process 34 is continued at step 38 by waiting for new requests 24. If the queue is non-empty, the process 34 is continued at step 40 by checking whether there are processing resources 32 available. If there are no free processing resources 32, no new requests 24 may be scheduled for execution and the process 34 is continued by waiting for a request 24 to be completed at step 42. If the queue is non-empty and there are free processing resources 32, a request 24 may be dequeued at step 44. At step 46, the DoP for the dequeued request 24 may be calculated based on the number of available processing resources 32, and other system state parameters like the length of the queue, etc. by the request dispatcher 28 as described above. In this regard, it is noted that different policies may be followed by the request dispatcher 28 when calculating the DoP. An example of a policy taking into account the queue length is DoP=number of available processing resources, if only a single request is in the queue, or DoP=number of available processing resources/queue length, if more than one request is in the queue.

Furthermore, if memory access exposes different "costs" of access depending on whether the memory is accessed by a local or by a remote processing resource 32, the threads may be assigned to the processing resources 32 which impose the lowest access costs possible. This policy may also be followed if the data on which the request operates is partitioned over different private memories (memory banks) of multiple processor cores 12. In this regard, a local processor core 12 may refer to a processor core 12 accessing its private memory 16, 18 while a remote processor core 12 may refer to a processor core 12 accessing the private memory 16, 18 of another processor core 12.

After assigning the threads to processing resources 32 at step 48, the threads may be executed at step 50 on the assigned processing resources 32. For instance, if processing (complex) database queries, e.g. SQL queries, the query processing may involve query plan generation and query execution. The generated plan may represent at least one request 24. After the DoP is calculated for the at least one request 24, the at least one request 24 may be executed with the level of parallelism dictated by the DoP.

What is claimed is:

1. A system comprising:
a processor having multiple processing resources; and
a non-transitory memory storing instructions, that when executed by the processor, cause the system to perform steps comprising:
process multiple threads in parallel; and
dispatch incoming requests and determine a number of parallel threads for the requests; and
dynamically determine the number of parallel threads based on an availability of the processing resources for processing the incoming requests;
wherein, when multiple requests $R=\{1, \ldots, N\}$ are to be dispatched that can be processed by a maximum number $M_R$ of parallel threads, the determined number of parallel threads for each of the multiple requests is to be equal to a number P of available processing resources divided by a number N of the multiple requests which are to be dispatched, when P/N is equal to or smaller than $M_R$ for $R=\{1, \ldots, N\}$ and P/N is an integer.

2. The system of claim 1, further comprising steps to:
dynamically determine the number of parallel threads based on the availability of the processing resources for processing the incoming requests and a maximum number $M_R$ of parallel threads into which the incoming requests can be divided, wherein the determined number of parallel threads is to avoid:
idle processing resources, unless dictated by the maximum number $M_R$ of parallel threads; and
more than one thread being concurrently assigned to one processing resource.

3. The system of claim 1, wherein, if a single request is to be dispatched that can be processed by a maximum number M of parallel threads, the determined number of parallel threads for the single request is:
to be equal to a number P of available processing resources, if P is equal to or smaller than M; and
to be equal to M, if P is larger than M;
wherein M and P are positive integers.

4. The system of claim 1, further comprising steps to dispatch a request when a processing resource is to become or becomes idle.

5. The system of claim 1, further comprising steps to:
receive information indicating the number of parallel threads for the requests from the request dispatcher; and
select one or more processing resources for processing the requests in accordance with the number of parallel threads.

6. The system of claim 5, wherein the one or more processing resources are to be selected based on an availability of locally stored data required for processing the requests.

7. The system of claim 6, wherein each processing resource has a private cache assigned thereto and locally stored data is data stored in the private cache.

8. The system of claim 1, further comprising steps to dynamically determine the number of parallel threads based on an availability of the processing resources for processing the incoming requests and a predicted access to locally stored data required for processing the requests.

9. The system of claim 1, wherein the processing resources are processor cores.

10. A method comprising:
receiving, by a request dispatcher of a multi-core processor, a request, wherein the request can be processed by one or more cores of the multi-core processor;
receiving, by the request dispatcher, availability data regarding the cores of the multi-core processor, the availability data indicating which cores are idle or are to become idle; and
determining, by the request dispatcher, a number of parallel threads for the request based on the availability data;
wherein, when multiple requests $R=\{1, \ldots, N\}$ are to be dispatched that can be processed by a maximum number $M_R$ of parallel threads, the determined number of parallel threads for each of the multiple requests is to be equal to a number P of available processing resources divided by a number N of the multiple requests which are to be dispatched, when P/N is equal to or smaller than $M_R$ for $R=\{1, \ldots, N\}$ and P/N is an integer.

11. The method of claim 10, wherein the request dispatcher dynamically determines the number of parallel threads based on the availability data and a maximum number $M_R$ of parallel threads into which the incoming request can be divided, wherein the determined number of parallel threads avoids:
   idle processing resources, unless dictated by the maximum number $M_R$ of parallel threads; and
   more than one thread being concurrently assigned to one core.

12. The method of claim 10, further comprising:
   receiving, by a request executor, information for indicating the determined number of parallel threads for the request from the request dispatcher; and
   selecting, by the request executor, one or more cores for processing the request in accordance with the determined number of parallel threads.

13. The method of claim 12, wherein the one or more cores are selected based on an availability of locally stored data required for processing the request.

14. The method of claim 13, wherein each core has a private cache and locally stored data is data stored in the private cache.

15. The method of claim 10, wherein the availability data comprises data indicating which cores are idle or are to become idle and data indicating a predicted access of the request to data stored in one or more private caches of the cores.

16. A non-transitory computer-readable medium comprising program code for performing a method comprising:
   receiving, by a request dispatcher of a multi-core processor, a request, wherein the request can be processed by one or more cores of the multi-core processor;
   receiving, by the request dispatcher, availability data regarding the cores of the multi-core processor, the availability data indicating which cores are idle or are to become idle; and
   determining, by the request dispatcher, a number of parallel threads for the request based on the availability data;
   wherein, when multiple requests $R=\{1, \ldots, N\}$ are to be dispatched that can be processed by a maximum number $M_R$ of parallel threads, the determined number of parallel threads for each of the multiple requests is to be equal to a number P of available processing resources divided by a number N of the multiple requests which are to be dispatched, when P/N is equal to or smaller than $M_R$ for $R=\{1, \ldots, N\}$ and P/N is an integer.

* * * * *